(No Model.)

E. S. BOYNTON.
GALVANIC BATTERY.

No. 550,039.  Patented Nov. 19, 1895.

WITNESSES:
J. W. Wiman
Peter A. Ross

INVENTOR:
Edward S. Boynton,
By Henry Connett
Attorney.

UNITED STATES PATENT OFFICE.

EDWARD S. BOYNTON, OF BROOKLYN, NEW YORK.

GALVANIC BATTERY.

SPECIFICATION forming part of Letters Patent No. 550,039, dated November 19, 1895.

Application filed February 21, 1895. Serial No. 539,194. (No model.)

*To all whom it may concern:*

Be it known that I, EDWARD S. BOYNTON, a citizen of the United States, residing at Brooklyn, in the county of Kings and State of New York, have invented certain new and useful Improvements in Galvanic Batteries, of which the following is a specification.

My invention relates to galvanic batteries for generating electric currents; and the object is, in the main, to provide a battery in which all of the cells or elements are merged or combined into the form of a common receptacle for the liquid electrolyte, one of the electrodes forming a fixed part of said receptacles and the other being removable.

The invention will be fully described hereinafter, and its novel features carefully defined in the claims.

Figure 1:
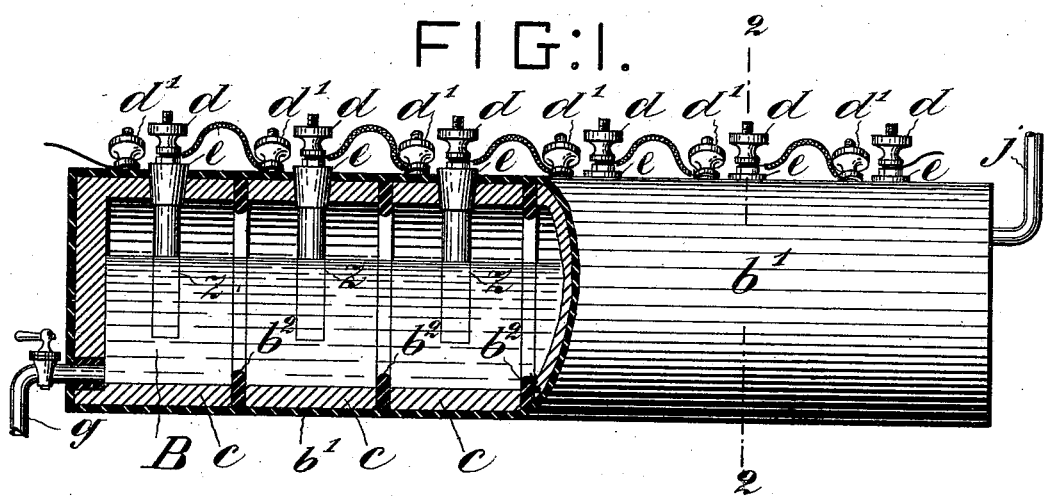
Figure 2:
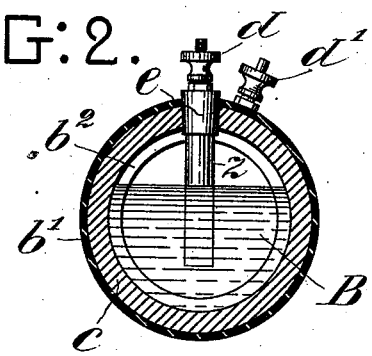

In the accompanying drawings, which illustrate an embodiment of the invention, Figure 1 is a side view of the battery in longitudinal vertical mid-section at the left-hand end, and Fig. 2 is a cross-section of the same on line 2 2 in Fig. 1.

In this battery $b'$ is a casing of hard rubber or any suitable material, here shown as cylindrical, although this form is not essential. This casing is continuous and serves as an envelope for electrodes $c$, of carbon, which are in the form of open-ended hollow cylinders placed end to end and separated and insulated from each other at their abutting ends by rings or washers $b^2$ of insulating material. The ends of the casing are both closed, and preferably the carbon electrodes at the extremities of the battery will have their outer ends closed, as seen at the left in Fig. 1. The liquid electrolyte B is contained within the single continuous chamber formed by the hollow carbon electrodes.

The zinc electrodes $z$ are provided with insulating-stoppers $e$, which fit into holes formed in the casing and in the respective carbons $c$, as shown, and each electrode $z$ is provided with a binding-post $d$. The binding-posts $d'$ of the carbon electrodes are set in the carbons in the usual way.

This battery may be made by adding elements of any length desired and also by enlarging the elements laterally of any diameter desired. The elements or cells of the battery have a common electrolyte; but the battery yields a voltage due to all of the elements when they are connected up in series, as shown in Fig. 1.

It will be observed that the carbon elements are separated from each other by the insulating rings or washers $b^2$, and these rings have each a circular aperture less in diameter than the hollow or bore of the tube-like carbons, whereby the ring forms a sort of flange or circumferential rib between adjacent carbons about the inner wall of the chamber containing the electrolyte. This chamber may be charged with the liquid electrolyte at an inlet $j$ and the liquid be drawn off for cleansing and renewal at an outlet $g$.

The elongated cylindrical form of the battery is advantageous for some special uses to which the battery is to be put; but it may as well be rectangular or polygonal in cross-section.

It will be noted that my battery does not consist merely of a series of isolated elements inclosed in a tube or casing and connected in series, which is a well-known construction, but a series of elements inclosed in a tubular casing, the positive and negative elements of the several elements being directly connected through the medium of a liquid electrolyte which is common to all of the elements and extends throughout the continuous chamber within the series of open-ended tubular carbons of the elements. The coupling up in series is exterior to the casing.

I do not limit myself to any special liquid electrolyte, as there are several which may be used. The ordinary bichromate solution will serve.

Having thus described my invention, I claim—

1. A galvanic battery having a common exterior casing for the elements, wholly closed at its sides and ends, and having a series of tubular, open-ended, carbon electrodes arranged end-to-end within said casing and insulated from each other at their abutting ends, whereby a continuous chamber for a liquid electrolyte is formed, said chamber extending through all of the carbons, substantially as set forth.

2. A galvanic battery comprising a series of hollow, tube-like, carbon electrodes, arranged end-to-end and separated at their adjacent ends by insulating material, whereby an electrolyte-chamber, common to all the cells or elements, is formed, electrodes $z$, inserted in apertures in the walls of the respective carbon electrodes and extending into the said chamber, and a suitable casing inclosing the series of hollow electrodes, substantially as set forth.

3. A galvanic battery having the chamber to contain the liquid electrolyte for, and common to, all of the elements, formed of similar, open-ended, hollow carbons arranged end-to-end and separated from each other by insulating material, the hollows in the several carbons communicating and being continuous whereby the electrolyte is free to flow from one end of the series of carbons to the other, substantially as set forth.

4. The combination to form a galvanic battery, of a closed casing $b'$, a series of hollow, carbon electrodes $c$, in said casing and arranged end-to-end therein, insulating rings $b^2$, between the abuttings ends of the carbons, and the electrodes $z$, removably set in apertures in the respective carbons and insulated from the latter, a chamber to contain an electrolyte being thus formed within the hollows of the series of carbons, substantially as set forth.

In witness whereof I have hereunto signed my name in the presence of two subscribing witnesses.

EDWARD S. BOYNTON.

Witnesses:
 HENRY CONNETT,
 PETER A. ROSS.